United States Patent [19]
Kimura

[11] Patent Number: 5,926,564
[45] Date of Patent: *Jul. 20, 1999

[54] CHARACTER RECOGNITION METHOD AND APPARATUS BASED ON 0-1 PATTERN REPRESENTATION OF HISTOGRAM OF CHARACTER IMAGE

[75] Inventor: Masayuki Kimura, Ishikawa-ken, Japan

[73] Assignee: Japan Advanced Institute of Science and Technology, Hokuriku, Ishikawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/539,687

[22] Filed: Oct. 5, 1995

[30] Foreign Application Priority Data

Dec. 15, 1994 [JP] Japan .................................... 6-312049

[51] Int. Cl.$^6$ ...................................................... G06K 9/00
[52] U.S. Cl. ........................................... 382/170; 382/174

[58] Field of Search ..................................... 382/101, 102, 382/138, 170, 171, 168, 172, 174, 185, 186

[56] References Cited

U.S. PATENT DOCUMENTS

| | | | |
|---|---|---|---|
| 4,974,077 | 11/1990 | Kusaba | 382/174 |
| 5,052,044 | 9/1991 | Gaborski | 382/170 |
| 5,245,674 | 9/1993 | Cass et al. | 382/181 |
| 5,521,985 | 5/1996 | Camp, Jr. et al. | 382/170 |
| 5,594,811 | 1/1997 | Hong et al. | 382/216 |

*Primary Examiner*—Yon J. Couso
*Attorney, Agent, or Firm*—Oblon, Spivak, McClelland, Maier & Neustadt, P.C.

[57] ABSTRACT

Predetermined recognition units are extracted from an input document image. Histograms are prepared based on the extracted recognition units. By partially collating a 0-1 pattern representation extracted from the prepared histograms of each recognition unit with 0-1 pattern representations of respective recognition target categories, which are prepared in advance, candidates of recognition target categories corresponding to the recognition unit are retrieved.

10 Claims, 13 Drawing Sheets

| | | | | | |
|---|---|---|---|---|---|
| STANDARD CHARACTERS |  | | | | |
| HISTOGRAM IN VERTICAL DIRECTION |  | | | | |
| HISTOGRAM IN HORIZONTAL DIRECTION |  | | | | |
| | FIG. 6A | FIG. 6B | FIG. 6C | FIG. 6D | FIG. 6E |
| | | | | | |
|---|---|---|---|---|---|
| STANDARD CHARACTER |  | | | | |
| HISTOGRAM IN VERTICAL DIRECTION | 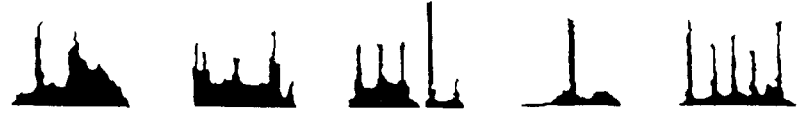 | | | | |
| HISTOGRAM IN HOLIZONTAL DIRECTION |  | | | | |
| | FIG. 6F | FIG. 6G | FIG. 6H | FIG. 6I | FIG. 6J |

FIG. 7A  FIG. 7B  FIG. 7C  FIG. 7D  FIG. 7E
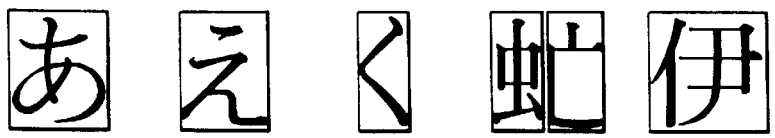
FIG. 7F  FIG. 7G  FIG. 7H  FIG. 7I  FIG. 7J

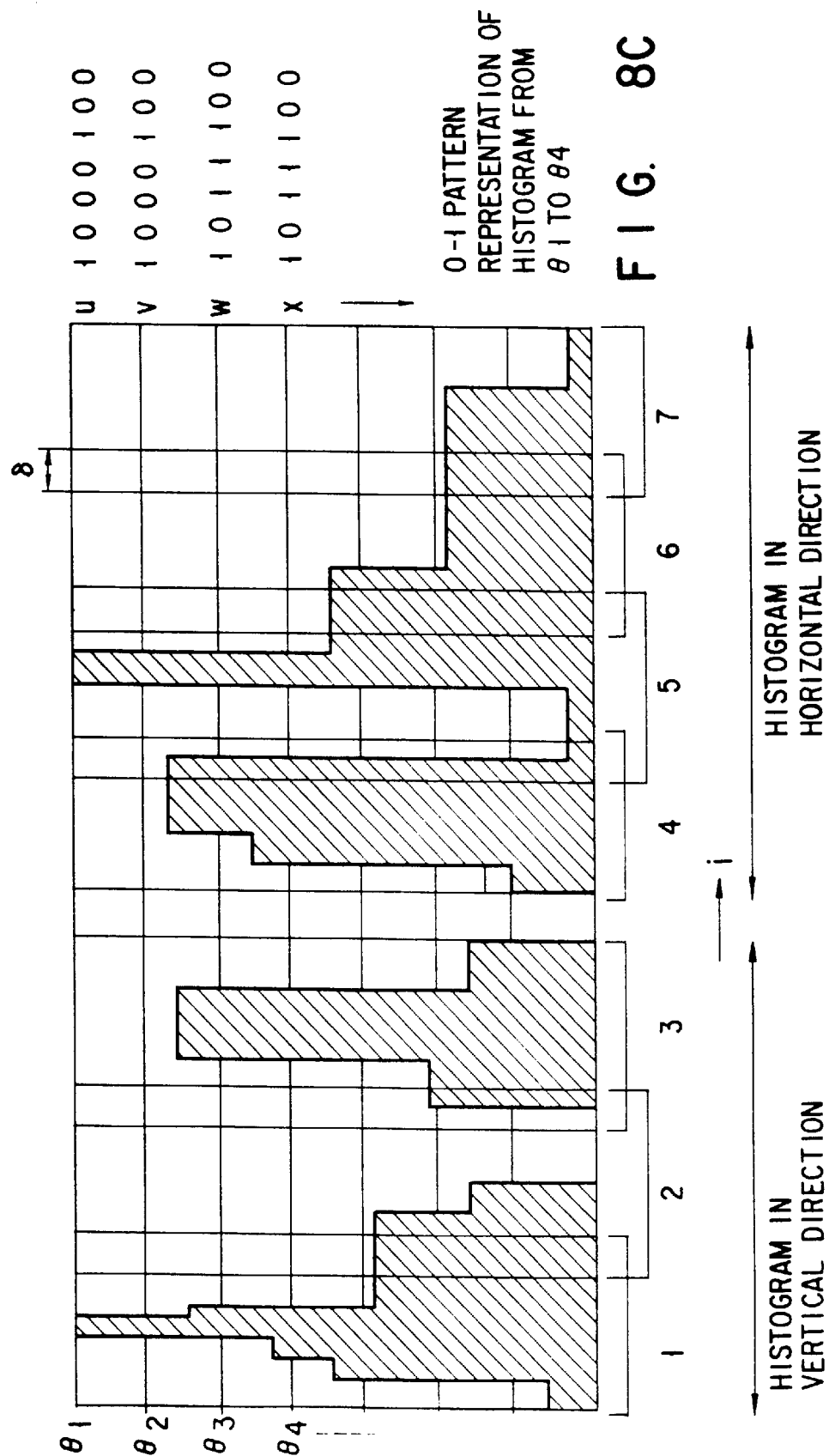
FIG. 8A  HISTOGRAM IN VERTICAL DIRECTION
FIG. 8B  HISTOGRAM IN HORIZONTAL DIRECTION
FIG. 8C  0-1 PATTERN REPRESENTATION OF HISTOGRAM FROM $\theta_1$ TO $\theta_4$

CHARACTER RECOGNITION METHOD AND APPARATUS BASED ON 0-1 PATTERN REPRESENTATION OF HISTOGRAM OF CHARACTER IMAGE

BACKGROUND OF THE INVENTION

1. Field of the Invention

The present invention relates to a character recognition method and apparatus for recognizing a character image on a paper sheet.

2. Description of the Related Art

A character recognition apparatus is suitable for an information processing apparatus which performs formation of electronic documents or data base, document processing, automatic translation, and the like of a huge volume of printed documents, and has been extensively studied and developed.

A conventional character recognition system for recognizing a character image printed or handwritten on a paper sheet normally comprises (1) document image input processing, (2) character extraction processing, (3) pre-processing (smoothing, normalization, thin-line conversion, and the like), (4) feature extraction processing, (5) rough classification processing, (6) fine classification processing, (7) post processing, and the like.

In such a character recognition system, character images on a paper sheet are read as an optical image, and the optical image is converted into an electrical signal. The character images read into the system are extracted into predetermined recognition units, e.g., in units of characters, on the basis of, e.g., the histogram of the marginal distribution. Thereafter, the extracted characters are subjected to the pre-processing to allow efficient recognition. In the feature extraction processing, the features of input characters, such as topological features, features in units of pixels divided into a mesh pattern, and the like are extracted so as to perform the recognition processing using the structure analysis method, the pattern matching method, or the like. The rough classification processing is especially used for, e.g., Kanji characters with a large number of character categories, and limits or narrows down candidate categories by a simple method. In the fine classification processing, more detailed recognition processing is performed for the limited candidates. Furthermore, in the post processing, when candidates cannot be determined by the recognition processing of individual input characters, neighboring input characters are coupled, and are discriminated as a character string with reference to, e.g., a pertinent grammar.

The conventional character recognition system suffers the following problems.

In the character extraction processing, when a plurality of discrete characters successively appear, extraction errors tend to occur. This is one of major factors which determine the precision of character recognition. As an effective countermeasure against this problem, a method of improving character extraction precision in association with recognition is known. However, this method requires a long time for recognition.

In the feature extraction processing, a character image which is normalized to a predetermined size is scanned in units of pixels (bits), and the feature vector (obtained by numerically expressing the features) of a character is extracted in consideration of the relationship between the scanned pixel and its neighboring pixels. Therefore, the feature vector obtained in this way is easily influenced by noise. Such a feature amount expresses the overall or total feature of each character but does not always reveal the outstanding feature of each character.

In the character recognition used in the conventional rough classification or fine classification, pattern matching (a kind of distance calculation) for measuring the total degree of similarity between an unknown input character expressed by the feature vector and a standard pattern in a dictionary is performed, and a proper number of candidate types are selected in the order of smaller distances. In such a conventional method, since the distance scale is the only criterion for the classification, the outstanding structural features of each character cannot be flexibly utilized in the process of the classification. For this reason, in the conventional method, an unknown input pattern must be compared with standard patterns of all the character types. For example, when the number of character types is 5,000, distance calculations are required 5,000 times. This drawback is the most serious obstacle to high-speed character recognition. Furthermore, it is difficult to check the validity of the classification or recognition results in the process of character recognition, and the checking and correction operations of recognition errors are entrusted to the post processing, e.g., collation with a huge word dictionary. This drawback is also a serious obstacle to high-speed processing.

On the other hand, Jpn. Pat. Appln. KOKAI Publication Nos. 63-15383 (pattern collation apparatus), 63-118993 (character recognition method), and 63-131287 (character recognition system) attempt to realize high-speed processing by realizing high-speed rough classification by a method which is not associated with any distance calculations and by performing distance calculations for only a small number of limited candidate character types. However, in these methods, since a character image is scanned, and features are extracted by a method of checking neighboring pixels in units of pixels (one dot) as basic means, the extracted features are easily influenced by noise, and it is very difficult to limit candidate character types with high precision using such a feature vector.

As described above, the conventional character recognition method and apparatus cannot be satisfactorily put into high-grade practical applications in terms of their noise resistance, recognition speed, and recognition precision due to the nature of the recognition processing to be used.

SUMMARY OF THE INVENTION

The present invention has been made in consideration of the above situation, and has as its object to provide a character recognition method and apparatus, which has improved practicality by simultaneously improving the noise resistance, recognition speed, and recognition precision.

The present invention can realize extraordinary high-speed and high-precision character recognition by efficiently utilizing information associated with the structure of a character via the histogram of a character image.

More specifically, a character recognition apparatus according to the present invention comprises: extraction means for extracting predetermined recognition units from an input document image; histogram preparing means for preparing a histogram on the basis of each of the extracted recognition units; and rough classification means for retrieving candidates of a recognition target category corresponding to the recognition unit by partially collating a 0-1 pattern representation extracted from the prepared histogram of the recognition unit and 0-1 pattern representations of recognition target categories which are prepared in advance.

Preferably, the apparatus further comprises fine classification means for inspecting validities of the retrieved candidates of the recognition target categories.

Preferably, the fine classification means inspects the validities on the basis of partial collation results between the 0-1 pattern representation extracted from the prepared histogram of the recognition unit and those, corresponding to the retrieved candidates of the recognition target categories, of the 0-1 pattern representations of the recognition target categories, which are prepared in advance.

Preferably, the apparatus further comprises priority determination means for determining priority of the retrieved candidates of the recognition target categories.

Preferably, the apparatus further comprises priority determination means for determining priority of the inspected candidates of the recognition target categories.

Preferably, the recognition unit corresponds to a character.

On the other hand, a character recognition method according to the present invention comprises: the extraction step of extracting predetermined recognition units from an input document image; the histogram preparing step of preparing a histogram from each of the extracted recognition units; and the rough classification step of partially collating a 0-1 pattern representation extracted from the prepared histogram of each recognition unit with 0-1 pattern representations of recognition target categories which are prepared in advance, and retrieving candidates of the recognition target categories corresponding to the recognition unit.

Preferably, the method further comprises the fine classification step of inspecting validities of the retrieved candidates of the recognition target categories.

Preferably, the fine classification step includes the step of inspecting the validities on the basis of partial collation results between the 0-1 pattern representation extracted from the prepared histogram of the recognition unit and those, corresponding to the retrieved candidates of the recognition target categories, of the 0-1 pattern representations of the recognition target categories, which are prepared in advance.

Preferably, the method further comprises the priority determination step of determining priority of retrieved recognition target categories.

Preferably, the method further comprises the priority determination step of determining priority of retrieved recognition target categories.

Preferably, the recognition unit corresponds to a character.

The present invention pays attention to the fact that the sizes and the positional relationship between vertical and horizontal line segments are directly reflected in the structures of histograms in the vertical and horizontal directions, and also pays attention to the fact that the sizes and the positional relationship between oblique line segments are reflected in histograms in two directions, i.e., the ±45° directions. Thus, according to the present invention, by utilizing 0-1 pattern representations of histograms, the influence of noise is efficiently absorbed, and structural information of each character is effectively utilized.

More specifically, according to the present invention, an input document image is extracted into predetermined recognition units, i.e., in units of characters, and histograms in, e.g., the vertical and horizontal directions are prepared on the basis of the extracted recognition units.

A 0-1 pattern representation extracted from the prepared histogram of each recognition unit is partially collated with 0-1 pattern representations of recognition target categories, which are prepared in advance, so as to retrieve candidates of recognition target categories corresponding to the recognition unit, thereby limiting category candidates (e.g., character candidates). As a result, one or a plurality of candidates of recognition target categories are output as recognition results (or rough classification results).

The present invention requires only simple operations such as comparison/discrimination, counting, and the like, but does not require any complicated image processing such as distance calculations based on the pattern matching method, normalization, thin-line conversion, and the like of character images unlike in the prior art. In this invention, simple processing, i.e., preparation of histograms is the only image processing. In this manner, by collating an unknown input character with standard patterns with a smaller calculation amount, the processing speed of the large classification can be remarkably improved.

By using partial collation based on 0-1 pattern representations using histograms of character images, which are presented first by the present invention, since structural information of each character is directly reflected in the histogram as outstanding feature information, a character can be recognized with high precision by the above-mentioned simple collation processing.

Since 0-1 pattern representations of histograms are used, the influence of noise can be efficiently absorbed, thus greatly improving noise resistance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 6A through 6J are views showing the histograms, in the vertical and horizontal directions, of various character images;

FIGS. 7A through 7J are views showing the histograms, in the vertical and horizontal directions, of various character images;

FIGS. 8A through 8C are views for explaining the histograms in the vertical and horizontal directions and 0-1 pattern representations;

DETAILED DESCRIPTION OF THE PREFERRED EMBODIMENTS

The preferred embodiment of the present invention will be described hereinafter with reference to the accompanying drawings.

Basically, the present invention pays attention to the fact that information associated with the structure of each character is directly reflected in marginal distributions (to be referred to as histograms hereinafter), in the respective directions, of a character image. The histograms are efficiently utilized by partially collating the histogram of an extracted input character image with those of standard characters on the basis of their 0-1 pattern representations, thereby remarkably improving the processing speed, including automatic checking processing of recognition errors, of character recognition. Therefore, the present invention can be expected to remarkably improve the practicality of character recognition.

Figure 1:
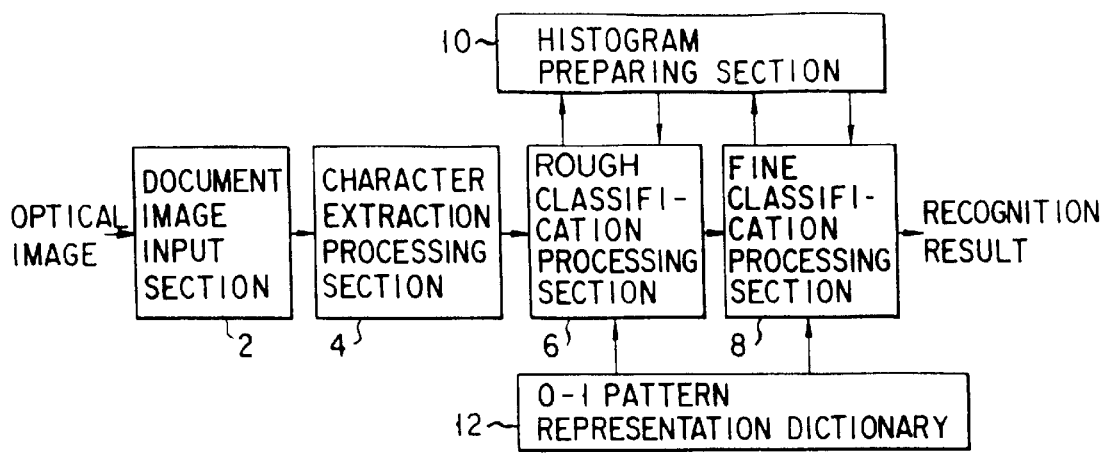
FIG. 1 is a block diagram showing the arrangement of a character recognition system according to an embodiment of the present invention.
Figure 2:
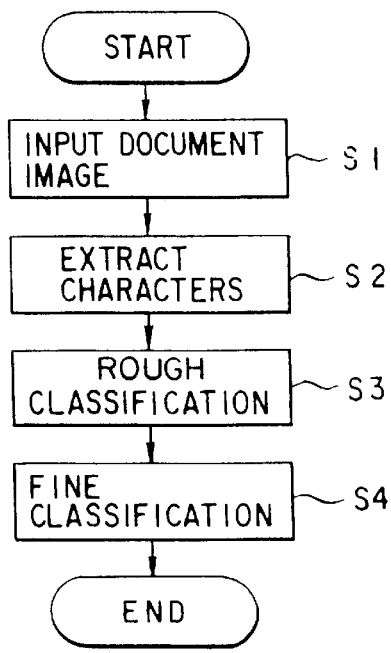
FIG. 2 is a schematic flow chart showing the character recognition processing of the embodiment shown in FIG. 1.

FIG. 1 shows the arrangement of a character recognition system according to an embodiment of the present invention. FIG. 2 is a schematic flow chart showing the character recognition processing of this embodiment.

As shown in FIG. 1, the character recognition system of the present invention comprises a document image input section 2, a character extraction processing section 4, a rough classification processing section 6, a fine classification processing section 8, a histogram preparation section 10, and a 0-1 pattern representation dictionary 12 (dictionary memory). The histogram preparation section 10 prepares a histogram based on the dot pattern of a character. The 0-1 pattern representation dictionary 12 has a standard dictionary of 0-1 pattern representations of standard characters used in rough and fine classifications.

The document image input section 2 reads a character image printed on a document surface using, e.g., an image scanner, and converts the read character image into an electrical signal. Thereafter, the section 2 quantizes the density value of the read character image to two, black and white values in accordance with a predetermined threshold value, and outputs the quantized data (step S1).

The character extraction processing section 4 executes extraction processing for extracting characters from the input image. In this case, a character line and individual characters can be extracted by utilizing a known technique. For example, the rule of the arrangement of characters on a paper sheet is taken into account, and features such as histograms (marginal distributions), connectivity of local regions, and the like are utilized.

When histograms are used, individual characters are extracted using the column (row) histogram of a document image and the histograms of character images in correspondence with the vertical (horizontal) writing format. For example, since the rule of the arrangement of a character string or characters is reflected in the marginal distribution (the distribution of count values of black pixels) in the vertical or horizontal direction, the character pitch is extracted from the detected rule, and periodic spacings between adjacent characters are detected based on the detected character pitch, thus determining extraction positions. When discrimination processing of, e.g., vertically (horizontally) separable characters is required, it is effective to extract characters in cooperation with recognition processing such as sort procedures (to be described later).

When the character extraction is realized based on the histograms of the marginal distributions, the histogram preparation section 10 can be utilized.

The character extraction processing section 4 supplies the dot patterns of extracted unknown input characters to the rough classification processing section 6 (step S2).

The large classification section 6 obtains histograms in the vertical and horizontal directions on the basis of the dot pattern of each extracted character supplied from the character extraction processing section 4 using the histogram preparation section 10. Then, the section 6 executes rough classification processing of the histograms of each unknown input character using the 0-1 pattern representation dictionary 12. The section 6 supplies the processing results and the dot patterns of the characters (if necessary) to the fine classification processing section 8 (step S3).

The fine classification processing section 8 executes fine classification processing (to be described later). In this case, in consideration of matching with the above-mentioned rough classification, candidate character types are efficiently selected with high precision without requiring any image processing such as normalization, thin-line conversion, or the like, by a new fine classification method based on the histograms.

Upon execution of the processing, the section 8 obtains, using the histogram preparation section 10, two histograms in the ±45° directions from the dot pattern of each extracted character supplied from the character extraction processing section 4 via the rough classification processing section 6 as needed, and executes fine classification processing using a second 0-1 pattern representation dictionary 12 (see FIG. 1). The final processing result is output as, e.g., a character code. When there are a plurality of character candidates, the priority of these candidates is determined, and is output together with their character codes (step S4).

Note that the output character codes and the like are stored in a RAM or a storage device such as a magnetic disk, and/or are displayed by a display device such as a CRT, a printer, or the like.

The character extraction, rough classification, and fine classification may be realized by a CPU, a memory, and a software program, but may be realized in a hardware matter to further improve the processing speed. Desired ones of the functional blocks shown in FIG. 1 may be realized in a hardware manner, and the remaining functional blocks may be realized in a software manner.

A new rough classification method in step S3 as the characteristic feature of the present invention will be described below. (Thereafter, the fine classification method in step S4 taking into account matching with the rough classification method and automatic error inspection (error checking) will be explained.)

Figure 3:
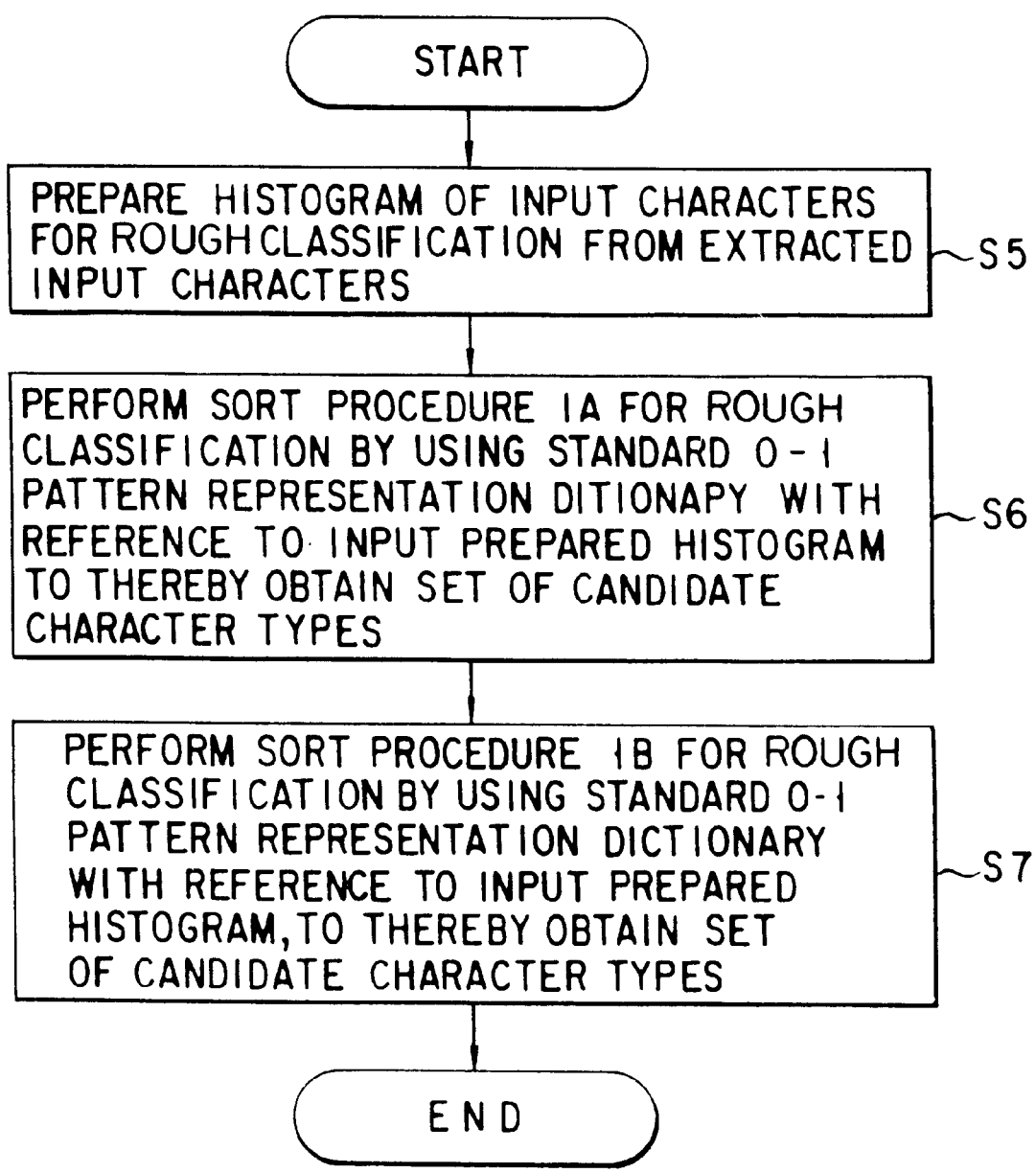
FIG. 3 is a schematic flow chart showing the rough classification procedure of the embodiment shown in FIG. 1.

FIG. 3 is a schematic flow chart of the rough classification procedure. In the rough classification, candidate character types are limited at remarkably higher speed as compared to those in the conventional method using a new method serving as the core of the present invention.

A histogram for rough classification of each unknown input character is prepared from the dot pattern of the extracted unknown input character using the histogram preparation section 10 (step S5).

A sort procedure 1A for rough classification (to be described later) is performed using the standard 0-1 pattern representation dictionary 12 with reference to the input prepared histogram, thus obtaining a set of candidate character types (step S6).

A sort procedure 1B for rough classification (to be described later) is performed using the standard 0-1 pattern representation dictionary 12 with reference to the input prepared histogram, thus obtaining a set of candidate character types (step S7).

The sets of candidate character types obtained in the sort procedures 1A and 1B are supplied to the fine classification processing section 8.

The histogram used in the rough and fine classification processing operations of this embodiment and its 0-1 pattern representation will be explained below.

The histogram used in this embodiment is a so-called marginal distribution, and a distribution of count values of black pixels in a direction such as the vertical direction, horizontal direction, ±45° directions, and the like. In this embodiment, as a target range of the histogram of a character image, an inscribed rectangular region defined by the height and width of a character is defined.

Figure 4:
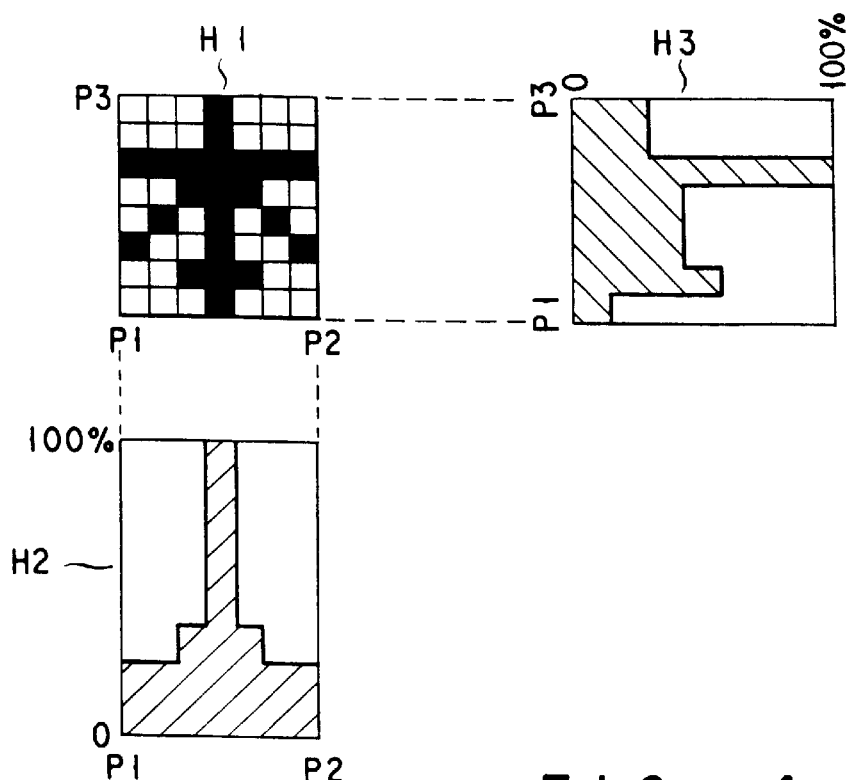
FIG. 4 is a view showing an example of the dot matrix of a character image " " and its histograms in the vertical and horizontal directions.

FIG. 4 shows an example of a dot matrix H1 representing a character image "本". The inscribed rectangular region includes 7 dots in the horizontal direction and 8 dots in the vertical direction. FIG. 4 also shows an example of a histogram H2 in the vertical direction, and an example of a histogram H3 in the horizontal direction.

Figure 5A:
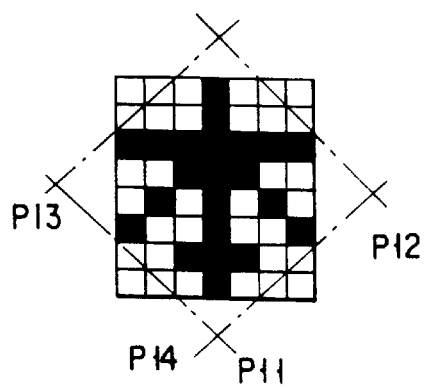
FIGS. 5A through 5C are views showing an example of the dot matrix of a character image and its histograms in the ±45° directions.
Figure 5B:
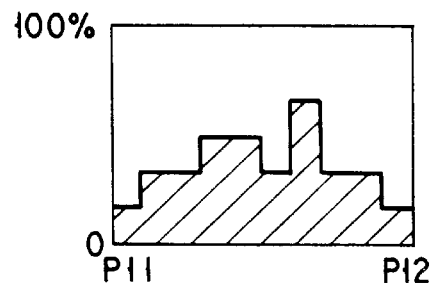
Figure 5C:
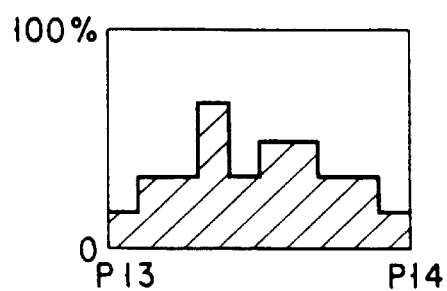

FIGS. 5A through 5C show examples of histograms in the ±45° directions.

FIGS. 6A through 6J and FIGS. 7A through 7J show examples of histograms, in the vertical and horizontal directions, of various character images.

Note that FIGS. 6A through 6J and FIGS. 7A through 7J show each of the histograms, in the horizontal direction of, e.g., "門", "執", and the like as examples of vertically separable characters as two histograms corresponding to the separated portions. In the rough classification of this embodiment, the histogram, in the horizontal direction of a vertically separable character is prepared as a single histogram which is not separated in the horizontal direction. More specifically, in this embodiment, the character extraction processing section 4 extracts a vertically separable character as one group.

Alternatively, as the histograms of vertically separable characters, two separated histograms may be prepared for each character, as shown in FIGS. 6A through 6J and FIGS. 7A through 7J, and the character extraction processing section 4 may extract a vertically separable character as separated patterns. In post processing, the separated portions may be coupled to restore the original character. Also, both these methods may be combined.

A 0-1 pattern representation used in the sort procedures 1A and 1B (and in sort procedures 2A and 2B to be described later) will be described below with reference to FIGS. 8A through 8C. FIGS. 8A and 8B show histograms in the vertical and horizontal directions used in the rough classification, and FIG. 8C shows a corresponding 0-1 pattern representation.

In order to obtain the 0-1 pattern representation shown in FIG. 8C from the histograms shown in FIGS. 8A and 8B, the following operations are performed.

First, the histogram in the vertical direction shown in FIG. 8A and the histogram in the horizontal direction shown in FIG. 8B are juxtaposed. The abscissas of the histograms in FIGS. 8A and 8B are respectively divided into L1 and L2 intervals. In consideration of variations of the type face, adjacent intervals are set to overlap each other by a proper width δ.

In FIGS. 8A and 8B, the heights of the histograms in the vertical and horizontal directions are respectively represented by percentages (%) with respect to the height and width of a character image. The interval [0, 100] of the ordinate is divided into m intervals. In each of m×(L1+L2) regions, if the histogram passes the region of interest, 1 is assigned to the region; if the histogram does not pass the region, 0 is assigned to the region. In this manner, the 0-1 pattern representation shown in FIG. 8C is obtained. When the height of the histogram is equal to 100%, it is determined that the histogram passes the 100% boundary of the ordinate.

Each interval of the abscissa is called a coordinate i (i=1, 2, ..., L1+L2). The ordinate is represented by a threshold value θ, and the two ends and division points are represented by θt (t=1, 2, ..., m+1). Note that θ1=100% and θm+1=0%. The respective regions of the 0-1 pattern representation of the histogram are expressed by (i, θt), where t=1, ..., m.

Note that a 0-1 pattern representation of histograms in the two, i.e., ±45° directions, which are used as needed in fine classification, has the same arrangement as described above.

The 0-1 pattern representation dictionary 12 has 0-1 pattern representations (for all the m×(L1+L2) regions) of recognition target characters obtained in this manner as standard patterns. Note that the standard patterns are obtained under predetermined preparation conditions (e.g., the number of intervals of the abscissa, and the like) of the 0-1 pattern representations. Also, the 0-1 pattern representations corresponding to a plurality of different preparation conditions may be prepared in units of recognition target characters.

The duality of the 0-1 pattern representation will be explained below.

Since the 0-1 pattern representation represents histograms, it is evident that:

(A) In a process of scanning the threshold value θt downward (toward θm+1=0%) from θ1=100% like t=1, 2, 3, ..., if the region (i, θt) is 1, all regions (i, θt') which satisfy t'≧t are 1; if the region (i, θt) is 0, all regions (i, θt') which satisfy t'≦t are 0.

On the contrary, it is also evident that:

(B) On the scale of the threshold value θt, 0% is assigned to a position which corresponds to 100% in (A) above, and 100% is assigned to a position which corresponds to 0% in (A). In a process of scanning upward (toward θm+1=0%) from θ1=100% like t=1, 2, 3, ..., if the region (i, θt) is 0, all regions (i, θt') which satisfy t'≧t are 0; if the region (i, θt) is 1, all regions (i, θt') which satisfy t'≦t are 1.

Such a relationship between (A) and (B) is referred to as the duality of the 0-1 pattern representation herein.

In this embodiment, sort procedures based on (A) and (B) for the 0-1 pattern representation of the histograms in the vertical and horizontal directions are referred to as sort procedures 1A and 1B, respectively, and are applied to the rough classification. On the other hand, sort procedures based on (A) and (B) for the 0-1 pattern representation of the histograms in the ±45° directions are referred to as sort procedures 2A and 2B, respectively, and are applied to the fine classification.

Figure 9A:
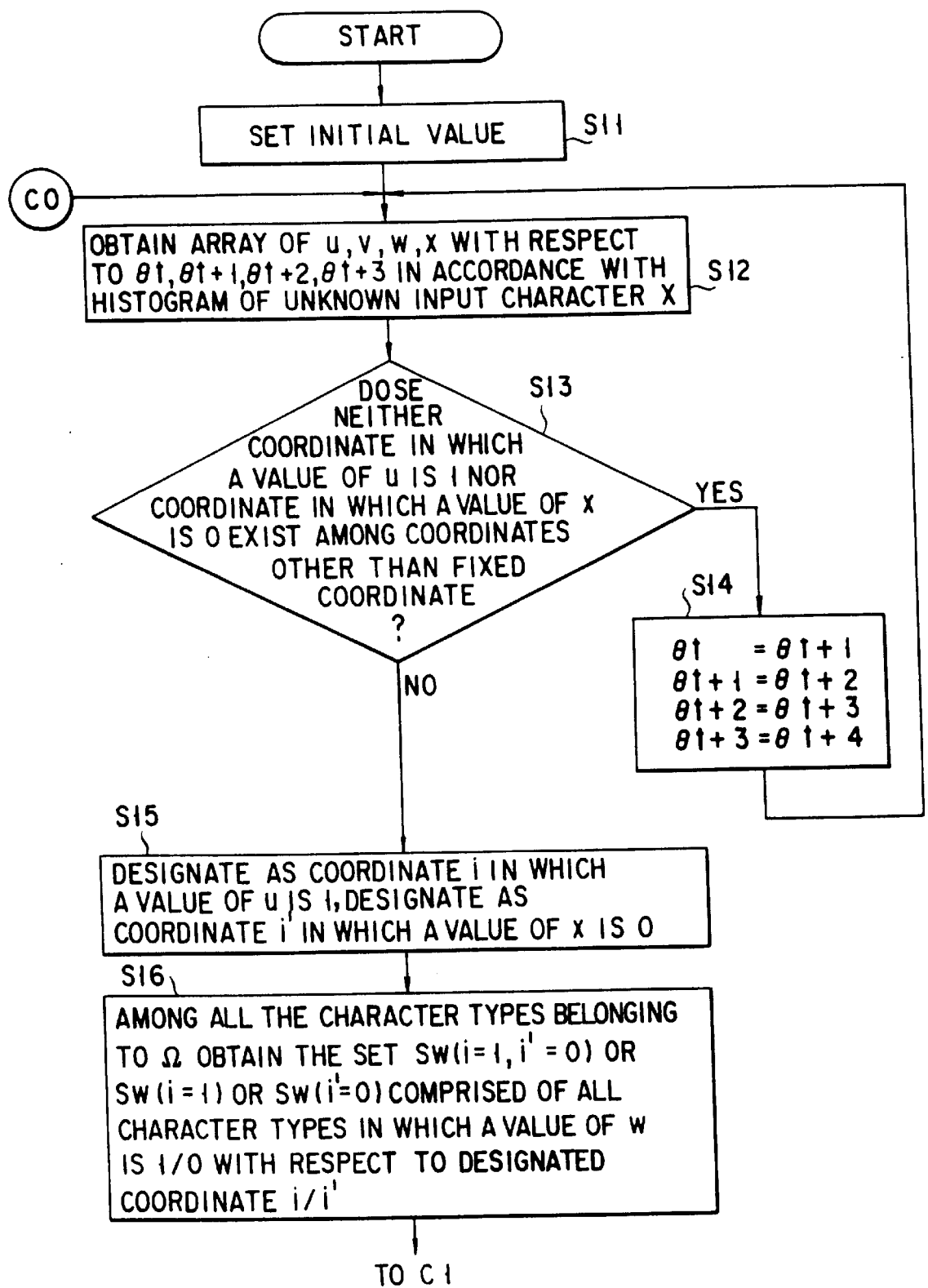
FIGS. 9A through 9C are flow charts showing the classification algorithm of a sort procedure 1A in the rough classification of the embodiment shown in FIG. 1.
Figure 9B:
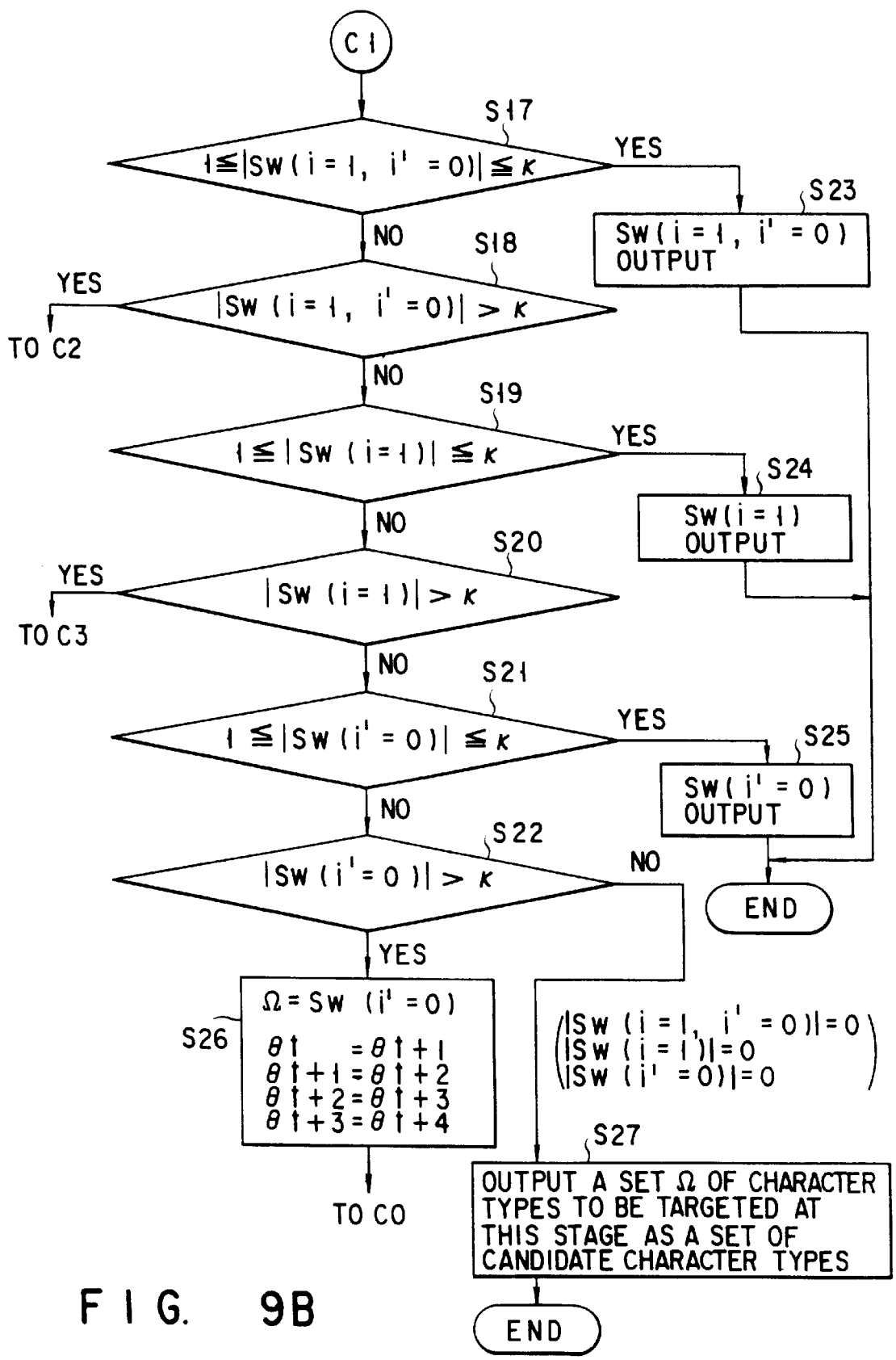
Figure 9C:
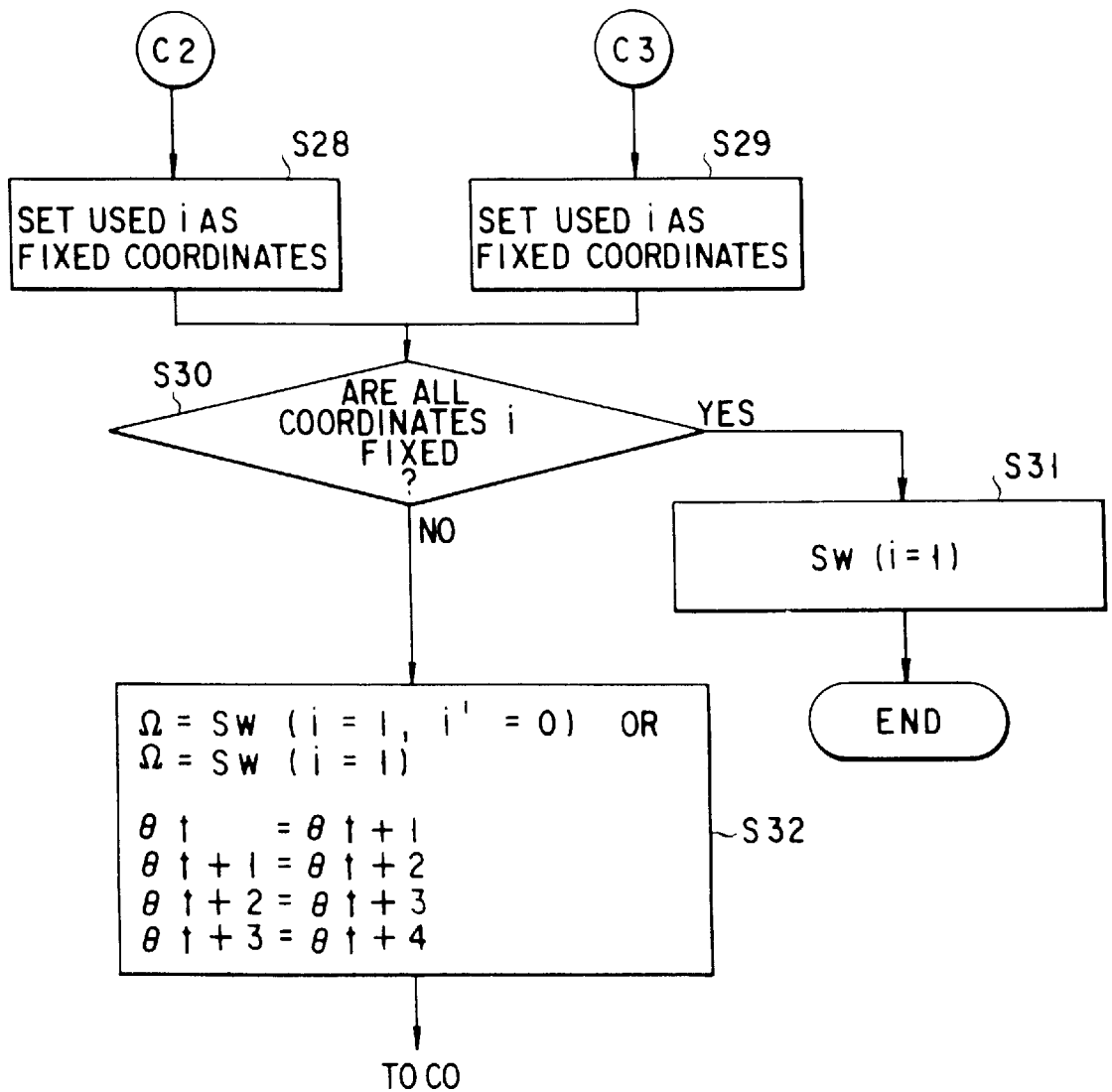
Figure 10A:
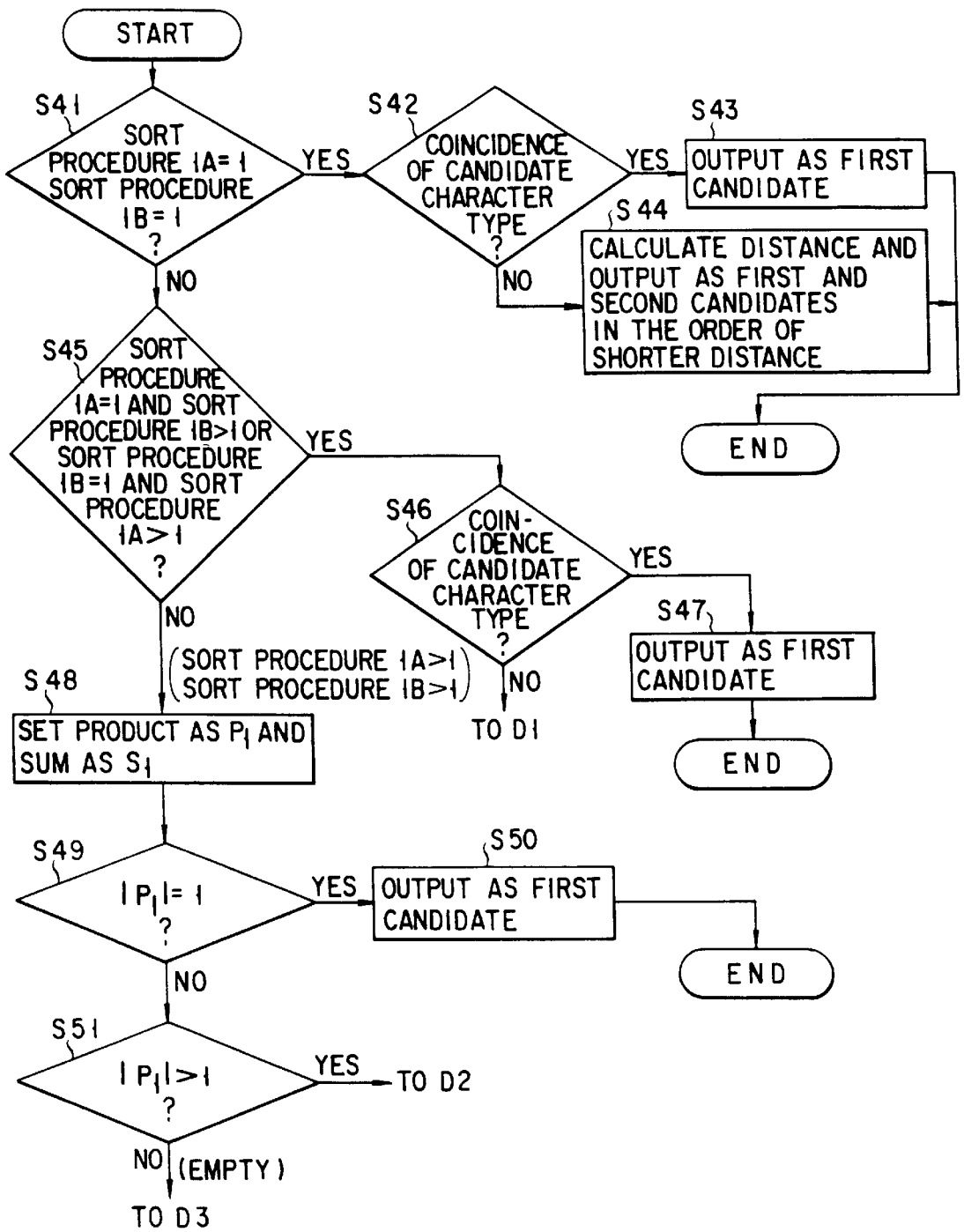
FIG. 10A is a flow chart showing the fine classification procedure of the embodiment shown in FIG. 1.
Figure 10B:
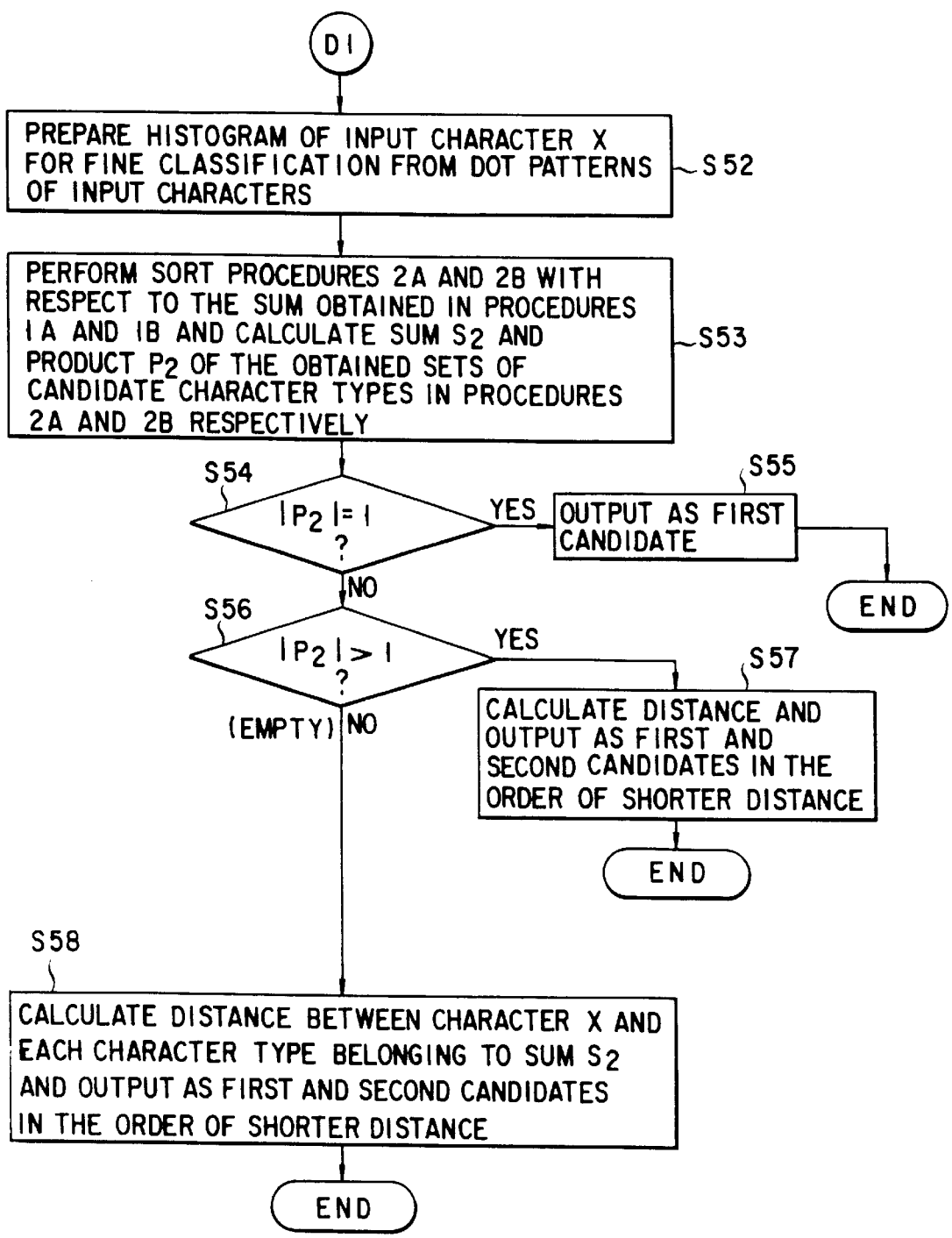
FIG. 10B is a flow chart showing the fine classification procedure of the embodiment shown in FIG. 1.
Figure 10C:
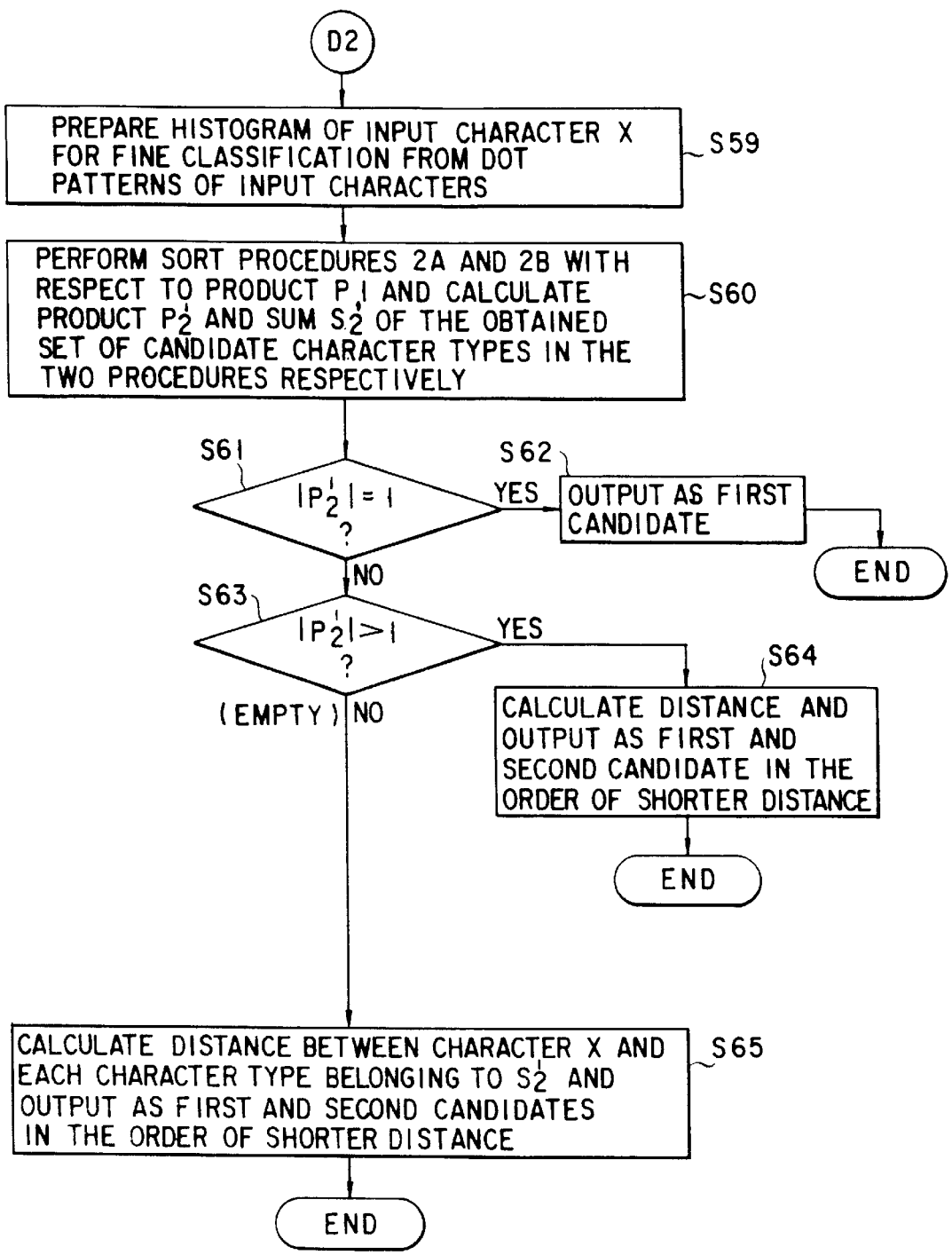
FIG. 10C is a flow chart showing the fine classification procedure of the embodiment shown in FIG. 1.
Figure 10D:
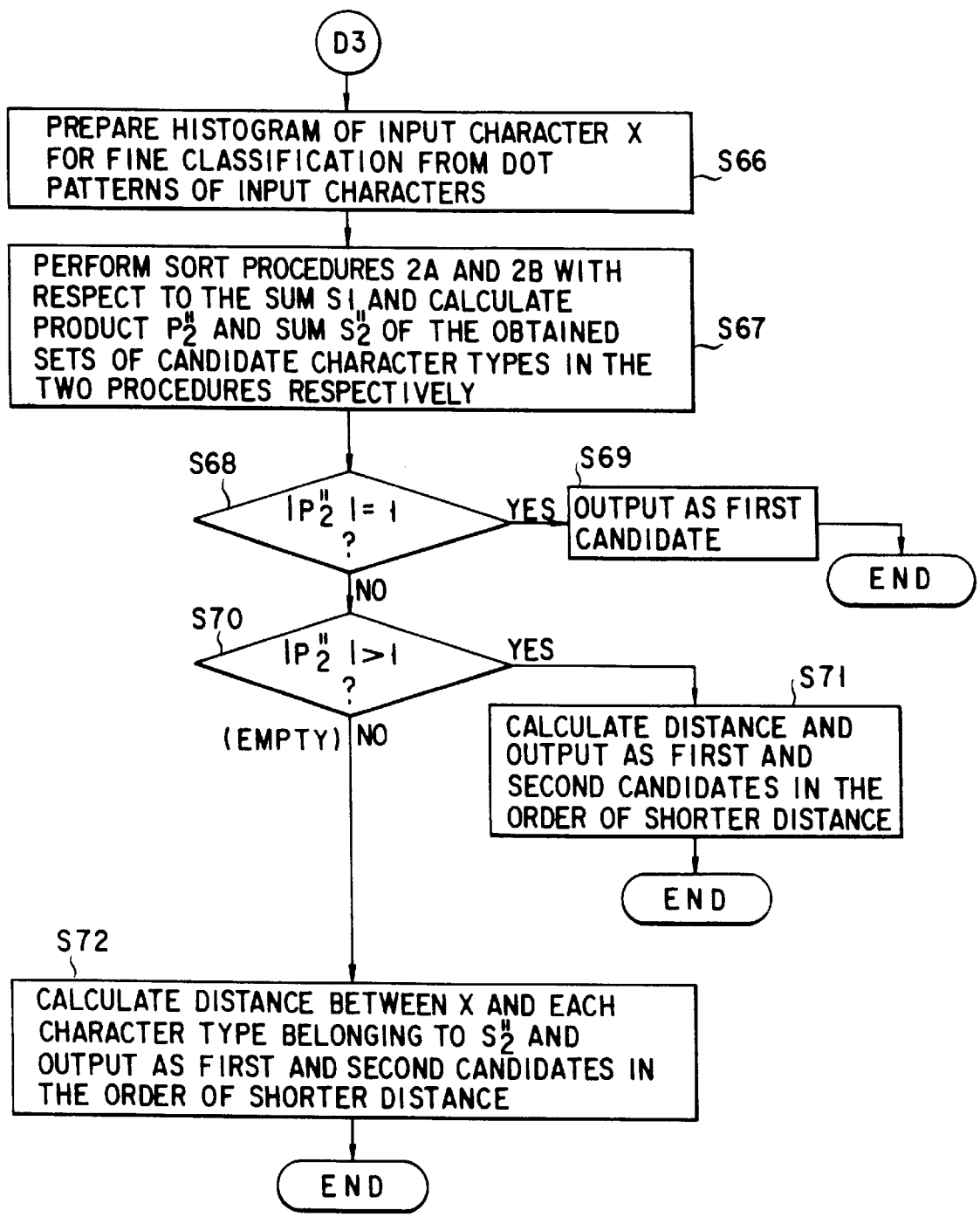
FIG. 10D is a flow chart showing the fine classification procedure of the embodiment shown in FIG. 1.

The sort procedure 1A used in the rough classification will be described below. FIGS. 9A through 9C show the sort algorithm of the sort procedure 1A. This processing is roughly divided into four processing operations (a), (b), (c), and (d).

Processing (a)

First, initial values are set (step S11). The overlapping width δ of the intervals and a constant κ serving as an index for limiting the number of candidate character types are determined. As an initial value, a set Ω of character types as objects to be sorted are set to be:

Ω=Set of all target character types (0-1 pattern representations)

Also, the ordinate is divided into m intervals, and the initial value of t is set to be:

t=1, θ1=100% (example: θt+1=θt−5%, t=1, 2, ..., m=20)

Note that every coordinate i is not fixed initially where to fix a coordinate means to exclude it from the following treatment.

Let u be an array (horizontal array) of 0 and 1 assumed by regions (i, θt) (i=1, 2, ..., L1+L2), and v, w, and x be arrays of 0 and 1 respectively assumed by (i, θt+1), (i, θt+2), and (i, θt+3) in the same way as (i, θt). In the following description, u, v, w, and x will be simply referred to as arrays.

u, v, w, and x represent partial patterns of the 0-1 pattern representation (FIG. 8C) on the basis of their determination method.

Processing (b)

The arrays u, v, w, and x are obtained with respect to the threshold values θt, θt+1, θt+2, and θt+3 in accordance with the histogram of an unknown input character X belonging to Ω (FIG. 8C) (step S12).

Processing (c)

When neither a coordinate in which the value of u is 1 nor a coordinate in which the value of x is 0 exists among the coordinates other than the fixed coordinate (if YES is determined in step S13), θt=θt+1, θt+1=θt+2, θt+2=θt+3, and θt+3=θt+4 are set (STEP S14), and the flow advances to processing (b) (step S12).

Otherwise (if NO is determined in step S13), a coordinate in which the value of u is 1 is designated as i, and a coordinate in which the value of x is 0 is designated as i' (step S15). Due to the nature of a histogram, i and i' are different from each other. In general, a plurality of coordinates i and a plurality of coordinates i' can exist.

Furthermore, at the coordinate i in which the value of u is 1, the value of w is 1, and at the coordinate i' in which the value x is 0, the value of w is 0. Among all the character types belonging to Ω, the set comprised of all character types in which the values of w are 1 and 0 with respect to all such coordinates i ($1 \leq i \leq L1+L2$) and i' ($1 \leq i' \leq L1+L2$) is respectively represented by Sw(i=1, i'=0). In this case, when one of i and i' does not exist, only the existing one is described in parentheses. More specifically, such a set is represented by Sw(i=1) or Sw(i'=0) in place of Sw(i=1, i'=0) (step S16).

If $1 \leq |Sw(i=1, i'=0)| \leq \kappa$ (if YES in step S17), Sw(i=1, i'=0) is output as a set of candidate character types (step S23), thus ending the processing.

If $|Sw(i=1, i'=0)| > \kappa$ (YES in step S18), all coordinates i used here are fixed (step S28), and the flow advances to processing (d) (to be described later; step S30).

If $1 \leq |Sw(i=1)| \leq \kappa$ (if YES in step S19), Sw(i=1) is output as a set of candidate character types (step S24), thus ending the processing.

If $|Sw(i=1)| > \kappa$ (if YES in step S20), all coordinates i used here are fixed (step S29), and the flow advances to processing (d) (to be described later; step S30).

If $1 \leq |SW(i'=0)| \leq \kappa$ (if YES in step S21), Sw(i'=0) is output as a set of candidate character types (step S25), thus ending the processing.

If $|Sw(i'=0)| > \kappa$ (if YES in step S22), Ω=Sw(i'=0) is set, and θt=θt+1, θt+1=θt+2, θt+2=θt+3, and θt+3=θt+4 are also set (step S26). Thereafter, the flow advances to processing (b) (step S12).

If $|Sw(i=1, i'=0)|=0$, $|Sw(i=1)|=0$, or $|Sw(i'=0)|=0$ (if NO in step S22), a set Ω of character types to be targeted at this stage is output as a set of candidate character types (step S27), thus ending processing.

Processing (d)

If all coordinates i ($1 \leq i \leq L1+L2$) are fixed (if YES in step S30), Sw(i=1, i'=0) is output when both i and i' exit as sets of candidate character types, or Sw(i=1) is output when only i exists (step S31), thus ending the processing.

If a coordinate i which is not fixed exists (NO in step S30), Ω=Sw(i=1, i'=0) or Ω=Sw(i=1) is set in correspondence with one of the above-mentioned two cases, and θt=θt+1, θt+1=θt+2, ηt+2=θt+3, and θt+3=θt+4 are also set. Then, the flow advances to step S32, and then returns to step S12.

The sort algorithm of the sort procedure 1A has been described.

The sort algorithm of the other sort procedure 1B used in the rough classification is obtained by replacing 0 by 1 and 1 by 0 in step S12 and subsequent steps. This is equivalent to applying the sort algorithm of the sort procedure 1A while replacing 0 by 1 and 1 by 0 in the 0-1 pattern representation in the sort procedure 1B. As described above, this relationship is called the duality of the sort procedures 1A and 1B.

The procedure of the fine classification processing will be explained below.

In the fine classification, the sort procedures 2A and 2B are used as needed. The sort algorithm of the sort procedure 2A is the same as that of the sort procedure 1A, and the sort algorithm of the sort procedure 2B is the same as that of the sort procedure 1B. However, these sort procedures use histograms in the ±45° directions as histograms of a character image, and are particularly effective for classification of characters having line segments with inclinations near ±45°.

The sort procedure 2A can be considered as one based on black pixels of a character image, and the sort procedure 2B can be considered as one based on white pixels thereof. In addition, these procedures are under different influences of noise. Therefore, when one and only candidate character type common to the sort results of the two procedures is present, the character type can be determined as a true candidate with sufficiently high reliability. Otherwise, processing for determining priority associated with reliability is performed, and a plurality of candidates are output. In this manner, automatic inspection of most of recognition errors (or classification errors) which cannot be attained by a conventional system can be realized.

A vector pattern used for determining priority in the fine classification processing and a distance calculation between vector patterns will be explained below.

0-1 patterns of histograms in the four directions, i.e., the vertical, horizontal and oblique (+45° directions) for an unknown input character X are arranged in a predetermined order, e.g., in the order of vertical, horizontal, −45°, and +45°, serial numbers are assigned to the respective coordinates of their abscissas, i.e., intervals, and a variable which assumes the number of 1s in each interval i as its value is represented by yi (for $1 \leq i \leq L1+L2+L3+L4=n$) where L3 and L4 represent the numbers of the two histograms in the 31 45° and +45° directions respectively. Then, a vector Y is defined as:

$$Y=(y1, y2, \ldots, yn)$$

From the definition of Y, each element yi assumes a non-negative integer.

Yj as a standard pattern for each character type Xj is given by an average value of vectors for some samples of an identical character type.

A normal Euclidean distance is used in a distance calculation between an unknown input character X and a standard pattern. In particular, when the influence of noise is taken into account, a Euclidean distance, which is weighted by the reciprocal number of the variance of elements of a vector, may be used.

Selection of the first candidate character type and error inspection are performed in the following procedure on the basis of the number of candidate character types obtained as a result of the rough classification with respect to an unknown input character X.

FIGS. 10A through 10D show the fine classification procedure. Where the following notations 1A=1 and 1A>1 are used to represent that 1A gives only one candidate character type and candidate character types more than one respectively and as for 1B the same notations are also used.

(i) When one candidate character type is obtained in each of the sort procedures 1A and 1B (if YES in step S41):

If the two candidate character types coincide with each other (if YES in step S42), the candidate character type is output as the first candidate (step S43).

If the two candidate character types do not coincide with each other (if NO in step S42), a distance calculation between the vector of the input X and the vectors (standard vectors) of the two candidate character types is performed, and these candidate character types are output as the first and second candidates in the order of shorter distances (step S44).

(ii) When one candidate character type is obtained in one of the sort procedures 1A and 1B and a plurality of candidate character types are obtained in the other sort procedure (if YES in step S45):

If one candidate character type limited in one sort procedure is included in a set of candidate character types in the other sort procedure (if YES in step S46), the candidate character type is output as the first candidate (step S47).

If one candidate character type limited in one sort procedure is not included in a set of candidate character types in the other sort procedure (if NO in step S46), the dot pattern of an unknown input character X is supplied from the rough classification processing section 6 to the histogram preparation section 10 to prepare the histograms of the input character X (step S52). The sort procedures 2A and 2B are performed with respect to the sum of the obtained sets of candidate character types in the procedures 1A and 1B. Then, the sum $S_2$ and the product $P_2$ of the obtained set of candidate character types in the procedure 2A and 2B are calculated respectively (step S53).

If the product $P_2$ includes only one character type (if YES in step S54), the character type is output as the first candidate (step S55).

If the product $P_2$ includes a plurality of character types (if YES in step S56), distance calculations between the unknown input character X and these character types are performed, and these character types are output as the first and second candidates in the order of shorter distances (step S57).

If the product $P_2$ is empty (if NO in step S56), distance calculations between the character X and each character type belonging to the sum $S_2$ are performed, and these character types are output as the first and second candidates in the order of shorter distances (step S58).

(iii) When a plurality of candidate character types are obtained in each of the sort procedures 1A and 1B (if NO in step S45), let $S_1$ and $P_1$ be a sum and a product respectively of the obtained sets of candidate character types in the two procedures (step S48).

When $P_1$ is not empty:

If the product $P_1$ includes only one character type (if YES in step S49), the character type is output as the first candidate (step S50).

If the product $P_1$ includes a plurality of character types (if YES in step S51), the dot pattern of an unknown input character X is supplied from the rough classification processing section 6 to the histogram preparation section 10 to prepare histograms (step S59). The sort procedures 2A and 2B are performed for the product $P_1$, and calculate a product $P_2'$ and a sum $S_2'$ of the obtained sets of candidate character types in the two procedures respectively (step S60).

If the set $P_2'$ includes only one character type (if YES in step S61), the character type is output as the first candidate (step S62).

If the set $P_2'$ includes a plurality of character types (if YES in step S63), distance calculations between the character X and these character types are performed, and the character types are output as the first and second candidates in the order of shorter distances (step S64).

If the set $P_2'$ is empty (if NO in step S63), distance calculations between the character X and each character type belonging to the sum $S_2'$ are performed, and the character types are output as the first and second candidates in the order of shorter distances (step S65).

When $P_1$ is empty (if NO in step S51):

The dot pattern of an unknown input character X is supplied from the rough classification processing section 6 to the histogram preparation section 10 to prepare histograms (step S66). The sort procedures 2A and 2B are performed for the sum $S_1$, and calculate a product $P_2''$ and a sum $S_2''$ of the obtained sets of candidate character types in the two procedures respectively (step S67).

If the product $P_2''$ includes only one character type (if YES in step S68), the character type is output as the first candidate (step S69).

If the product $P_2''$ includes a plurality of character types (if YES in step S70), distance calculations between the character X and these character types are performed, and the character types are output as the first and second candidates in the order of shorter distances (step S71).

If the set $P_2''$ is empty (if NO in step S70), distance calculations between the character X and each character type belonging to the sum $S_2''$ are performed, and the character types are output as the first and second candidates in the order of shorter distances (step S72).

The sort algorithm of the fine classification has been described.

As described above, this embodiment pays attention to the fact that the sizes and the positional relationship between vertical and horizontal line segments are directly reflected in the structures of histograms in the vertical and horizontal directions, and also pays attention to the fact that the sizes and the positional relationship between oblique line segments are reflected in histograms in two directions, i.e., the ±45° directions. Thus, according to this embodiment, by utilizing 0-1 pattern representations of histograms, the influence of noise is efficiently absorbed, and the structural information of each character is effectively utilized.

More specifically, the sort procedures of this embodiment are those based on the principle quite different from conventional pattern matching, which uses structural information based on the relationship among strokes such as vertical, horizontal, and oblique line segments constituting a character as basic means. The sort procedures of this embodiment require only simple operations such as comparison/easy discrimination, counting, and the like but do not require any complicated image processing such as normalization, thinning, and the like of a character image. In this embodiment, preparation of histograms is the only image processing.

In this manner, by attaining collation between an unknown input character and standard patterns in a smaller calculation amount, the processing speed of the rough classification can be remarkably improved. As for high accuracy, automatic checking processing of classification errors or recognition errors may be realized for the first time.

Furthermore, according to this embodiment, since the dual rough classification methods respectively based on black and white pixels can be realized, when only one character is commonly included in candidate character types of the two classification methods, the character can be considered as a true candidate with a very high probability, and automatic checking processing of recognition or classification errors can be realized.

As will be described later, in computer experiments, most of input character images may be correctly recognized in the process of the rough classification, and few character types will require the fine classification. The number of candidate character types to be sorted in the fine classification will be about 2, and it is easy to find a true candidate from these candidates, thus realizing high-precision recognition.

The reason why the present invention is strong against noise will be described below with reference to FIGS. 8A through 8C.

Pay attention to histograms (FIGS. 8A and 8B), in the vertical and horizontal directions, of an unknown input character X and arrays u, v, w, and x of "0"s and "1"s shown in FIG. 8C obtained by converting these histograms into a 0-1 pattern representation.

1) Each 1 in the array u means that "1"s continuously appear downward like v, w, x, . . . . On the other hand, each 0 in the array x means that "0"s continuously appear upward like w, v, u, . . . . Therefore, the first and fifth columns of "1"s in the array u and the second, sixth, and seventh columns of "0"s in the array x serve as outstanding structural information.

The structural information can be represented by the values of the corresponding coordinates of the array w (as an example), i.e., the first and fifth "1"s, and the second, sixth, and seventh "0"s. In this case, in order to change the first and fifth "1"s in the array w to "0"s by noise in the direction of height, the noise must have a magnitude large enough to sequentially change u, v, and w to 0, and in order to change the second, sixth, and seventh "0"s in the array w to "1"s, noise must have a magnitude large enough to sequentially change x and w to 1.

2) In order to reinforce the above-mentioned structural information against noise, the first and fifth columns of "1"s can be represented by the first and fifth "1"s in the array x. In order to change these "1"s to 0, noise must have a magnitude large enough to sequentially change "1"s in the arrays u, v, w, and x to "0"s. On the other hand, the second, sixth, and seventh columns of "0"s can be represented by "0"s at the corresponding coordinates in the array u. In order to change these "0"s to "1"s, noise must have a magnitude large enough to sequentially change "0"s in the arrays x, w, v, and u to "1"s.

In the method of this embodiment, various variations are available to reinforce the information against noise in the direction of height. In methods 1) and 2) above, the former method is relatively weak to noise but is slightly advantageous since this operation can be continued to the position of 10% from the lowermost array in terms of limiting the number of candidate character types (the latter method allows this operation to the position of 20% from the lowermost array). This variation can be flexibly utilized depending on the degree of noise.

In the method of this embodiment, a practical problem is caused by noise associated with a shift (positional displacement) in the horizontal direction (called coordinates). The horizontal intervals (coordinates) overlap each other by 2δ. However, when a peak of a histogram appears near the boundary between adjacent intervals, the height of the histogram in the corresponding interval extremely changes even due to a small positional displacement. In such a case, two 0-1 patterns (standard patterns) are prepared to absorb this variation, i.e., so-called multi-templates are used. Even when the number of templates increases, since collation is very simple, the influence on the recognition speed will be negligible.

Various other modifications of the present invention may be made within the spirit and scope of the invention.

The experimental results obtained by the present inventors using a character recognition system according to the present invention will be exemplified below.

A difference in the calculation amount required for rough classification and a difference in the number of candidate character types between the prior art and this embodiment will be compared.

When recognition target character types are assumed to be 3,122 JIS level-1 character types (2,965 kanji characters, 147 kana characters, and 10 numeric characters), the conventional rough classification requires 3,122 distance calculations (pattern matching) per unknown input character, while the rough classification of this embodiment requires only simple calculations including comparison/easy discrimination and counting per unknown input character using the sort procedures 1A and 1B. In addition, the number of candidate character types will be limited to 2 or less on the average with such a small calculation amount.

In this manner, this embodiment can realize high-speed, recognition processing since it does not require any huge amount of distance calculations (3,122 times) with all the standard patterns (3,122 character types), which disturb realization of high-speed processing.

According to a method disclosed in "High-speed Character Recognition Algorithm Based on Associative Matching Method", Journal of Society of Information Processing, Vol. 32, No. 3, pp. 404–413 (1991), the number of candidate character types can be limited to 5. However, this method also requires distance calculations (pattern matching).

Examples of the average number of candidate character types obtained by the experiments of the rough classification of this embodiment will be described below.

When a data set which is the same as a set of characters for which standard patterns are prepared are input (almost under an ideal condition):

i) The average number of candidate character types for 156 English letter types was 1.11 in the sort procedure 1A and 1.12 in the sort procedure 1B.

ii) The average number of candidate character types for 3,122 JIS level-1 character types was 1.25 in the sort procedure 1A and 1.27 in the sort procedure 1B.

iii) The average number of candidate character types for 157 kana/numeric character types in 3,122 JIS level-1 character types was 1.10 in the sort procedure 1A and 1.11 in the sort procedure 1B.

The candidate character types obtained in each processing all included a true candidate.

In this case, the abscissas of histograms in the vertical and horizontal directions are respectively divided into 6 intervals, and the ordinates have 100% positions respectively corresponding to the height and width of a character. These histograms are divided into 20 intervals to be quantized to 0-1 patterns.

As for English letters, a Roman type face, bold type face, and italic type face as typical type faces of 26 English letter types, and their capital and small letters are considered as different character types, and a total of 156 character types are used.

Examples of the average number of candidate character types obtained by the experiments of the rough classification under the influence of noise will be described below.

i) As for English letters, classification experiments were conducted for 52 character types including 11 sets of Roman capital and small letters printed by slightly different printers. In this case, standard patterns were prepared based on an arbitrary one of 11 sets of character types, and the remaining 10 sets of character types were used as unknown input characters. In this case, for four character types, a peak of a histogram was located near the boundary between adjacent intervals along the abscissa, and recognition errors occurred due to the influence of the positional displacement caused by noise. However, for these character types, classification errors could be avoided by preparing two each standard patterns.

The average number of candidate character types in the rough classification in this case was 1.23 in the sort procedure 1A and 1.23 in the sort procedure 1B.

The number of errors in a common set between the sort procedures 1A and 1B was 1 (classification accuracy: 98.0%), and a sum of sets of the results of the sort procedures 1A and 1B included a true candidate (classification accuracy: 100%).

ii) As for kanji and kana characters, 3,122 JIS level-1 character types were input using an image scanner, and were printed by slightly different printers to prepare for 11 sets of 3,112 character types. Of these sets, standard patterns were prepared using an arbitrary set, and the rough classification was performed for the remaining 10 sets.

For 157 kana/numeric character types of the 3,122 character types, the average number of candidate character types was 1.31.

In this case, six errors occurred due to the positional displacement caused by noise. However, since substantially the same character types cause errors, these errors can be eliminated by selecting a plurality of different standard patterns for each of these character types.

In the rough classification for 3,122 character types, the average number of candidate character types was 1.52.

Note that a further improvement can be expected by taking an appropriate countermeasure against classification errors caused by a variation in the horizontal direction due to noise.

The present invention is not limited to the above embodiment, and various changes and modifications may be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A character recognition method, comprising the steps of:

(a) extracting an unknown input character from an input document image;

(b) preparing histograms of the extracted unknown input character in vertical and horizontal directions;

(c) juxtaposing the histogram in the vertical direction and the histogram in the horizontal direction, such that an interval (a character width) from a first position to a last position in which the vertical histogram exists, and an interval (a character height) from a first position to a last position in which the horizontal histogram exists are linked to serve as abscissa, respectively, equidistantly dividing the intervals of the abscissa of the former and the latter of both the histograms into L1 and L2 intervals (L1, L2: a constant), respectively, and equidistantly dividing an interval (a character height) of ordinate of the former and an interval (a character width) of ordinate of the latter into m intervals (m: a constant), representing each interval of the abscissa by a coordinate (i=1, 2, . . . , L1+L2), representing the ordinate by $\theta_t$(t=1, 2, . . . , m+1, $\theta_1$=100%, $\theta_{m+1}$=0%), and generating 0-1 patterns by assigning, in each of m×(L1+L2) regions, 1 to the region if the histogram passes the region, and 0 to the region if the histogram does not pass the region;

(d) representing a constant for limiting the number of candidate character types into a predetermined number or less as k, representing a set of character types serving as objects to be sorted as $\Omega$={set of all target character types (0-1 pattern representation prepared in step (c))}, representing arrays of 0 and 1 represented by regions (i, $\theta_t$), (i, $\theta_{t+1}$), (i, $\theta_{t+2}$) and (i, $\theta_{t+3}$) (i=1, 2, . . . , L1+L2) as u, v, w, and x, respectively, and obtaining u, v, w and x with respect to the threshold values $\theta_t$, $\theta_{t+1}$, $\theta_{t+2}$, and $\theta_{t+3}$ of histograms of unknown input character belonging to $\Omega$;

(e) setting $\theta_t$=$\theta_{t+1}$, $\theta_{t+1}$=$\theta_{t+2}$, $\theta_{t+2}$=$\theta_{t+3}$, $\theta_{t+3}$=$\theta_{t+4}$, and executing the step (d) if neither a coordinate in which the value of u is 1 nor a coordinate in which the value of x is 0 exist among the coordinates other than fixed coordinate, in the 0-1 patterns of the unknown input character, representing, otherwise, a coordinate in which the value of u is 1 as i, and representing a coordinate in which the value of x is 0 as i', obtaining set $S_w$(i=1, i'=0) comprised of all character types in which the values of w are 1 and 0, respectively, with respect to all such coordinates i (1≤i≤L1+L2) and i' (1≤i'≤L1+L2) in the set $\Omega$, obtaining, if the i' does not exist, set $S_w$(i=1) comprised of all character types in which the value of w is 1 with respect to the coordinate i, obtaining, if the i does not exist, the set $S_w(i'=0)$ comprised of, all character types in which the value of w is 0 with respect to the coordinate i', outputting $S_w(i=1, i'=0)$ as a set of candidate character types if $1 \leq |S_w(i=1, i'=0)| \leq k$, executing step (f) with the all coordinates i fixed if $|S_w(i=1, i'=0)| > k$, outputting $S_w(i'=0)$ as a set of candidate character types if the i does not exist and $1 \leq |S_w(i'=0)| \leq k$, setting $\Omega = S_w(i'=0)$, $\theta_t = \theta_{t+1}$, $\theta_{t+1} = \theta_{t+2}$, $\theta_{t+2} = \theta_{t+3}$, $\theta_{t+3} = \theta_{t+4}$, and executing step (d) if $|S_w(i'=0)| > k$, and outputting a set $\Omega$ of character types to be targeted as a set of candidate character types;

(f) outputting $S_w(i=1, i'=0)$ if all coordinates i ($1 \leq i \leq L1 + L2$) are fixed and both i and i' exist, in step (e), as sets of candidate character types, outputting $S_w(i=1)$ if only i exists, setting $\Omega = S_w(i=1, i'=0)$ or $\Omega = S_w(i=1)$ and $\theta_t = \theta_{t+1}$, $\theta_{t+1} = \theta_{t+2}$, $\theta_{t+2} = \theta_{t+3}$, $\theta_{t+3} = \theta_{t+4}$, and executing the step (d) if a coordinate i which is not fixed exists; and (g) executing step (d) through (f) by replacing 0 by 1 and 1 by 0, of the 0-1 pattern and reversing a scale of the ordinate.

2. The method according to claim 1, further comprising the step of:

(i) executing the steps (c) and (g) with respect to each histogram of a character image in substantially ±45° degree directions.

3. The method according to claim 1, further comprising the steps of:

outputting the candidate character type as the first candidate if the candidate character type obtained by the steps (d) through (f) and the candidate character type obtained by step (g) are both one candidate and both the candidate character types coincide with each other, and performing, if both the candidate character types do not coincide with each other, a distance calculation between the unknown input character and both the candidate character types to output the candidate character types as the first and second candidates in the order of shorter distances.

4. The method according to claim 2, further comprising the steps of:

(k) outputting the candidate character type as the first candidate if one candidate character type is obtained by one of the steps (d) through (f) and the step (g) and a plurality of candidate character types are obtained by the other of the steps (d) through (f) and if the obtained one candidate character type is included in the obtained plurality of candidate character types, generating, if the obtained one candidate character type is not included in the obtained plurality of candidate character types, histograms in substantially ±45° degree directions of unknown character, executing the step (i) with respect to both the sum of sets, computing common classification of the obtained set of candidate character types, outputting the candidate character types as the first candidate if the common classification includes only one character type, performing, if the common classification includes a plurality of character types, distance calculations between the unknown input character and the character types to output the character types as the first and second candidate in the order of shorter distance, and performing, if the common classification is empty, distance calculations between unknown input character and each character type belonging to the sum of sets to output the character types as the first and second candidates in the order of shorter distance.

5. The method according to claim 2, further comprising the steps of:

outputting the candidate character type as the first candidate if a plurality of candidate character types are obtained in each of the execution of steps (d) through (f) and the execution of the step (g), and if P1 (P1: a product of the candidate character types obtained by both the steps (a) through (c) and the step (d)) is not empty and includes one character type, generating, if the P1 includes a plurality of character types, histograms of unknown input character in substantially ±45° degree directions, executing the step (i) with respect to P1, outputting the character type as the first candidate if P2' (P2': a product of the candidate character types obtained by the execution of the step (i)) includes only one character type, performing, if P2' includes a plurality of character types, distance calculations between unknown input character and the character types to output the character types as the first and second candidates, performing, if P2' is empty, distance calculations between unknown input character and each character type belonging to the sum of sets S2' (S2': sum of sets obtained by the execution of the step (i)) to output the character types as the first and second candidates in the order of shorter distances, generating, if P1 is empty, histograms of unknown input character in substantially ±45° degree directions, executing the step (i) with respect to the S1, outputting the character type as the first candidate if P2" (P2": a product of the candidate character types obtained by the execution of step (i) with respect to S1) includes only one character type, performing, if P2" includes a plurality of character types, distance calculations between unknown input character and the character types to output the character types as the first and second candidates, and performing, if P2" is empty, distance calculations between unknown input character and each character type of S2" (S2": sum of sets obtained by the execution of step (i) with respect to S1) to output the character type as the first and second candidates.

6. A character recognition apparatus, comprising:

means for performing the step (a) of extracting unknown input character from an input document image;

means for performing the step (b) preparing histograms of the extracted unknown input character in vertical and horizontal directions;

means for juxtaposing for executing the following steps:

(c) juxtaposing the histogram in the vertical direction and the histogram in the horizontal direction, such that an interval (a character width) from a first position to a last position in which the vertical histogram exists, and an interval (a character height) from a first position to a last position in which the horizontal histogram exists are linked to serve as abscissa, respectively, equidistantly dividing the intervals of the abscissa of the former and the latter of both the histograms into L1 and L2 intervals (L1, L2: a constant), respectively, and equidistantly dividing an interval (a character height) of ordinate of the former and an interval (a character width) of ordinate of the latter into m intervals (m: a constant), representing each interval of the abscissa by a coordinate (i=1, 2, . . . , L1+L2), representing the ordinate by $\theta_t$(t=1, 2, . . . , m+1, $\theta_1$=100%, $\theta_{m+1}$=0%), and generating 0-1 patterns by assigning, in each of m×(L1+L2) regions, 1 to the region if the histogram passes the region, and 0 to the region if the histogram does not pass the region;

rough classification means for executing the following steps:

(d) representing a constant for limiting the number of candidate character types into a predetermined number or less as k, representing a set of character types serving as objects to be sorted as Ω={set of all target character types (0-1 pattern representation prepared in step (c))}, representing arrays of 0 and 1 represented by regions (i, $\theta_t$), (i, $\theta_{t+1}$) (i, $\theta_{t+2}$) and (i, $\theta_{t+3}$) (i=1, 2, . . . , L1+L2) as u, v, w, and x, respectively, and obtaining u, v, w and x with respect to the threshold values $\theta_t$, $\theta_{t+1}$, $\theta_{t+2}$, and $\theta_{t+3}$ of histograms of unknown input character belonging to Ω;

(e) setting $\theta_t$=$\theta_{t+1}$, $\theta_{t+1}$=$\theta_{t+2}$, $\theta_{t+2}$=$\theta_{t+3}$, $\theta_{t+3}$=$\theta_{t+4}$, and executing the step (d) if neither a coordinate in which the value of u is 1 nor a coordinate in which the value of x is 0 exist among the coordinates other than fixed coordinate, in the 0-1 patterns of the unknown input character, representing, otherwise, a coordinate in which the value of u is 1 as i, and representing a coordinate in which the value of x is 0 as i', obtaining set $S_w$(i=1, i'=0) comprised of all character types in which the values of w are 1 and 0, respectively, with respect to all such coordinates i (1≤i≤L1+L2) and i' (1≤i'≤L1+L2) in the set Ω, obtaining, if the i' does not exist, set $S_w$(i=1) comprised of all character types in which the value of w is 1 with respect to the coordinate i, obtaining, if the i does not exist, the set $S_w$(i'=0) comprised of, all character types in which the value of w is 0 with respect to the coordinate i', outputting $S_w$(i=1, i'=0) as a set of candidate character types if 1≤|$S_w$(i=1, i'=0)|≤k, executing step (f) with the all coordinates i fixed if |$S_w$(i=1, i'=0)|>k, outputting $S_w$(i'=0) as a set of candidate character types if the i does not exist and 1≤|$S_w$(i'=0)|≤k, setting Ω=$S_w$(i'=0), $\theta_t$=$\theta_{t+1}$, $\theta_{t+1}$=$\theta_{t+2}$, $\theta_{t+2}$=$\theta_{t+3}$, $\theta_{t+3}$=$\theta_{t+4}$, and executing step (d) if |$S_w$(i'=0)|>k, and outputting a set Ω of character types to be targeted as a set of candidate character types;

(f) outputting $S_w$(i =1, i'=0) if all coordinates i (1≤i≤L1+L2) are fixed and both i and i' exist, in step (e), as sets of candidate character types, outputting $S_w$(i=1) if only i exists, setting Ω=$S_w$(i =1, i'=0) or Ω=$S_w$(i=1) and $\theta_t$=$\theta_{t+1}$, $\theta_{t+1}$=$\theta_{t+2}$, $\theta_{t+2}$=$\theta_{t+3}$, $\theta_{t+3}$=$\theta_{t+4}$, and executing the step (d) if a coordinate i which is not fixed exists; and (g) executing step (d) through (f) by replacing 0 by 1 and 1 by 0, of the 0-1 pattern and reversing a scale of the ordinate.

7. The apparatus according to claim 6, further comprising:

fine classification means for executing the following step:

(i) executing the steps (c) and (g) with respect to each histogram of a character image in substantially ±45° degree directions.

8. The apparatus according to claim 6, further comprising:

fine classification means for executing the following steps:

outputting the candidate character type as the first candidate if the candidate character type obtained by the steps (d) through (f) and the candidate character type obtained by step (g) are both one candidate and both the candidate character types coincide with each other, and performing, if both the candidate character types do not coincide with each other, a distance calculation between the unknown input character and both the candidate character types to output the candidate character types as the first and second candidates in the order of shorter distances.

9. The apparatus according to claim 7, further comprising:

fine classification means for executing the following steps:

(k) outputting the candidate character type as the first candidate if one candidate character type is obtained by one of the steps (d) through (f) and the step (g) and a plurality of candidate character types are obtained by the other of the steps (d) through (f) and if the obtained one candidate character type is included in the obtained plurality of candidate character type, generating, if the obtained one candidate character type is not included in the obtained plurality of candidate character types, histograms in substantially ±45° degree directions of unknown character, executing the step (i) with respect to both the sum of sets, computing common classification of the obtained set of candidate character type, outputting the candidate character types as the first candidate if the common classification includes only one character type, performing, if the common classification includes a plurality of character types, distance calculations between the unknown input character and the character type to output the character types as the first and second candidate in the order of shorter distances, and performing, if the common classification is empty, distance calculations between unknown input character and each character type belonging to the sum of sets to output the character types as the first and second candidates in the order of shorter distance.

10. The apparatus according to claim 7, further comprising:

means for executing the following steps:

outputting the candidate character type as the first candidate if a plurality of candidate character types are obtained in each of the execution of steps (d) through (f) and the execution of the step (g), and if P1 (P1: a product of the candidate character types obtained by both the steps (a) through (c) and the step (d)) is not empty and includes one character type, generating, if the P1 includes a plurality of character types, histograms of unknown input character in substantially ±45° degree directions, executing the step (i) with respect to P1, outputting the character type as the first candidate if P2' (P2': a product of the candidate character types obtained by the execution of the step (i)) includes only one character type, performing, if P2' includes a plurality of character types, distance calculations between unknown input character and the character types to output the character types as the first and second candidates, performing, if P2' is empty, distance calculations between unknown input character and each character type belonging to the sum of sets S2' (S2': sum of sets obtained by the execution of the step (i)) to output the character types as the first and second candidates in the order of shorter distances, generating, if P1 is empty, histograms of unknown input character in substantially ±45° degree directions, executing the step (i) with respect to the S1, outputting the character type as the first candidate if P2" (P2": a product of the candidate character types obtained by the execution of step (i) with respect to S1) includes only one character type, performing, if P2" includes a plurality of character types, distance calculations between unknown input character and the character types to output the character types as the first and second candidates, and performing, if P2" is empty, distance calculations between unknown input character and each character type of S2" (S2": sum of sets obtained by the execution of step (i) with respect to S1) to output the character type as the first and second candidates.

* * * * *